(12) United States Patent
Peyaud et al.

(10) Patent No.: US 9,766,009 B2
(45) Date of Patent: Sep. 19, 2017

(54) METHOD AND SYSTEM FOR TRANSPORT CONTAINER REFRIGERATION CONTROL

(75) Inventors: Fabienne Peyaud, Saint Pierre de Chandi (FR); JeanPhilippe Goux, Toussieu (FR); Virginie Choquart, Dagneux (FR)

(73) Assignee: CARRIER CORPORATION, Farmington, CT (US)

( * ) Notice: Subject to any disclaimer, the term of this patent is extended or adjusted under 35 U.S.C. 154(b) by 779 days.

(21) Appl. No.: 14/130,958

(22) PCT Filed: Jul. 7, 2011

(86) PCT No.: PCT/US2011/043137
§ 371 (c)(1),
(2), (4) Date: Jan. 6, 2014

(87) PCT Pub. No.: WO2013/006172
PCT Pub. Date: Jan. 10, 2013

(65) Prior Publication Data
US 2014/0137580 A1 May 22, 2014

(51) Int. Cl.
*F25D 21/06* (2006.01)
*F25D 21/00* (2006.01)
(Continued)

(52) U.S. Cl.
CPC ............ *F25D 21/002* (2013.01); *F25B 41/04* (2013.01); *F25B 47/02* (2013.01); *F25B 49/02* (2013.01);
(Continued)

(58) Field of Classification Search
CPC ........ F25D 21/002; F25D 21/08; F25B 41/04; F25B 47/02; F25B 49/02; F25B 2700/21171; F25B 2600/23
See application file for complete search history.

(56) References Cited

U.S. PATENT DOCUMENTS 3,978,684 A 9/1976 Taylor
4,292,661 A 9/1981 Johnson et al.
(Continued)

FOREIGN PATENT DOCUMENTS

JP H109690 A * 1/1998 ................ F25B 1/00
WO 0194857 A1 12/2001
(Continued)

OTHER PUBLICATIONS

Muneaki et al., Refrigerator, Jan. 16, 1998, JPH109690A, Whole Document.*
(Continued)

*Primary Examiner* — Larry Furdge
(74) *Attorney, Agent, or Firm* — Cantor Colburn LLP (57) ABSTRACT

A method of refrigeration control through a refrigeration system of a refrigerated transport container includes performing a defrost cycle on the refrigeration system by activating a heat source; and restarting the refrigeration system after the defrost cycle has completed, wherein restarting the refrigeration system includes performing a liquid slugging avoidance process including: initiating a compressor of the refrigeration system at a speed; opening a pressure equalization valve in parallel with the compressor in response to the initiating; opening a liquid valve in series between a condenser and an evaporator after opening of the pressure equalization valve; and closing the pressure equalization valve after a period of time.

16 Claims, 6 Drawing Sheets

(51) Int. Cl.
  *F25B 41/04* (2006.01)
  *F25B 47/02* (2006.01)
  *F25B 49/02* (2006.01)
  *F25D 21/08* (2006.01)

(52) U.S. Cl.
  CPC ....... *F25B 2500/26* (2013.01); *F25B 2500/28* (2013.01); *F25B 2600/025* (2013.01); *F25B 2600/0261* (2013.01); *F25B 2600/112* (2013.01); *F25B 2600/23* (2013.01); *F25B 2600/2519* (2013.01); *F25B 2700/2117* (2013.01); *F25B 2700/21171* (2013.01); *F25D 21/08* (2013.01); *Y02B 30/743* (2013.01)

(56) References Cited

U.S. PATENT DOCUMENTS

| | | | |
|---|---|---|---|
| 4,638,641 | A | 1/1987 | Taylor |
| 4,663,725 | A | 5/1987 | Truckenbrod |
| 4,922,728 | A | 5/1990 | Backus |
| 5,065,587 | A | 11/1991 | Howland et al. |
| 5,197,297 | A | 3/1993 | Brendel et al. |
| 5,564,287 | A | 10/1996 | Hearne, Jr. et al. |
| 5,596,878 | A | 1/1997 | Hanson et al. |
| 5,634,347 | A | 6/1997 | Hanson et al. |
| 6,085,533 | A * | 7/2000 | Kaido ............... F25B 49/022 62/175 |
| 6,138,461 | A | 10/2000 | Park et al. |
| 6,543,244 | B1 | 4/2003 | Amr |
| 6,631,620 | B2 | 10/2003 | Gray et al. |
| 6,708,510 | B2 | 3/2004 | Sulc et al. |
| 6,817,195 | B2 | 11/2004 | Rafalovich et al. |
| 7,043,927 | B2 | 5/2006 | Burchill et al. |
| 7,080,521 | B2 | 7/2006 | Ludwig et al. |
| 2005/0183427 | A1* | 8/2005 | Dudley ............... F25D 21/006 62/80 |
| 2007/0089443 | A1* | 4/2007 | Wu ............... F25B 41/043 62/228.1 |
| 2007/0271942 | A1 | 11/2007 | Yokoyama et al. |
| 2009/0217689 | A1 | 9/2009 | Chakiachvili et al. |
| 2010/0107661 | A1 | 5/2010 | Awwad et al. |
| 2010/0171364 | A1 | 7/2010 | Awwad |

FOREIGN PATENT DOCUMENTS

| | | | |
|---|---|---|---|
| WO | 0194859 A1 | 12/2001 | |
| WO | WO 2009091401 A1 * | 7/2009 | ............ F25B 9/008 |
| WO | 2011049767 A2 | 4/2011 | |

OTHER PUBLICATIONS

Huff, Capacity Modulation of Refrigerant Vapor Compression System, Jul. 23, 2009, WO2009/091404A1, Whole Document.*
Notification of Transmittal of the International Search Report and the Written Opinion of the International Searching Authority, for tInternational Application No. PCT/US2011/043137; Aug. 24, 2012, 8 pages.
PCT International Preliminary Report on Patentability and Written Opinion of the International Searching Authority for International Application No. PCT/US2011/043137, Jan. 16, 2014, 9 pages.

\* cited by examiner

METHOD AND SYSTEM FOR TRANSPORT CONTAINER REFRIGERATION CONTROL

FIELD OF INVENTION

The subject matter disclosed herein relates generally to the field of refrigeration, and more particularly to methods and systems of defrosting a transport container refrigeration system and avoiding compressor slugging.

DESCRIPTION OF RELATED ART

Generally, in direct drive transport refrigeration, a road compressor is directly coupled to a vehicle. The associated refrigerating system is relatively simple with few valves that do not protect the compressor against liquid flow back. Because these systems use hot gas defrost technology with a shunted condenser and expansion valve, the compressor may systematically suck liquid from the evaporator during and after the hot gas defrost. Accordingly, compressor damage and premature failure is possible. Furthermore, in direct drive applications subsequent defrost-timings are non-optimal. Thus, the art would well receive improvements in defrosting transport container refrigeration systems and avoiding compressor slugging in transport container refrigeration systems

BRIEF SUMMARY

According to an example embodiment of the present invention, a method of refrigeration control through a refrigeration system of a refrigerated transport container includes performing a defrost cycle on the refrigeration system by activating a heat source; and restarting the refrigeration system after the defrost cycle has completed, wherein restarting the refrigeration system includes performing a liquid slugging avoidance process including: initiating a compressor of the refrigeration system at a speed; opening a pressure equalization valve in parallel with the compressor in response to the initiating; opening a liquid valve in series between a condenser and an evaporator after opening of the pressure equalization valve; and closing the pressure equalization valve after a period of time.

According to another example embodiment of the present invention is a refrigeration system, comprising: a condenser; a compressor in serial communication with the condenser; an evaporator in serial communication with the condenser and the compressor; a heat source for thawing an evaporator coil during a defrost cycle; a pressure equalization valve arranged in parallel with the compressor; a liquid valve in series between the condenser and the evaporator; a controller for controlling the pressure equalization valve and the liquid valve to implement a liquid slugging avoidance process upon restart of the compressor after a defrost cycle.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of methods and systems of transport container refrigeration control and defrost operations are described herein in detail. Technical effects and benefits of such methods include limiting compressor liquid flow through novel starting sequences.

Figure 1:
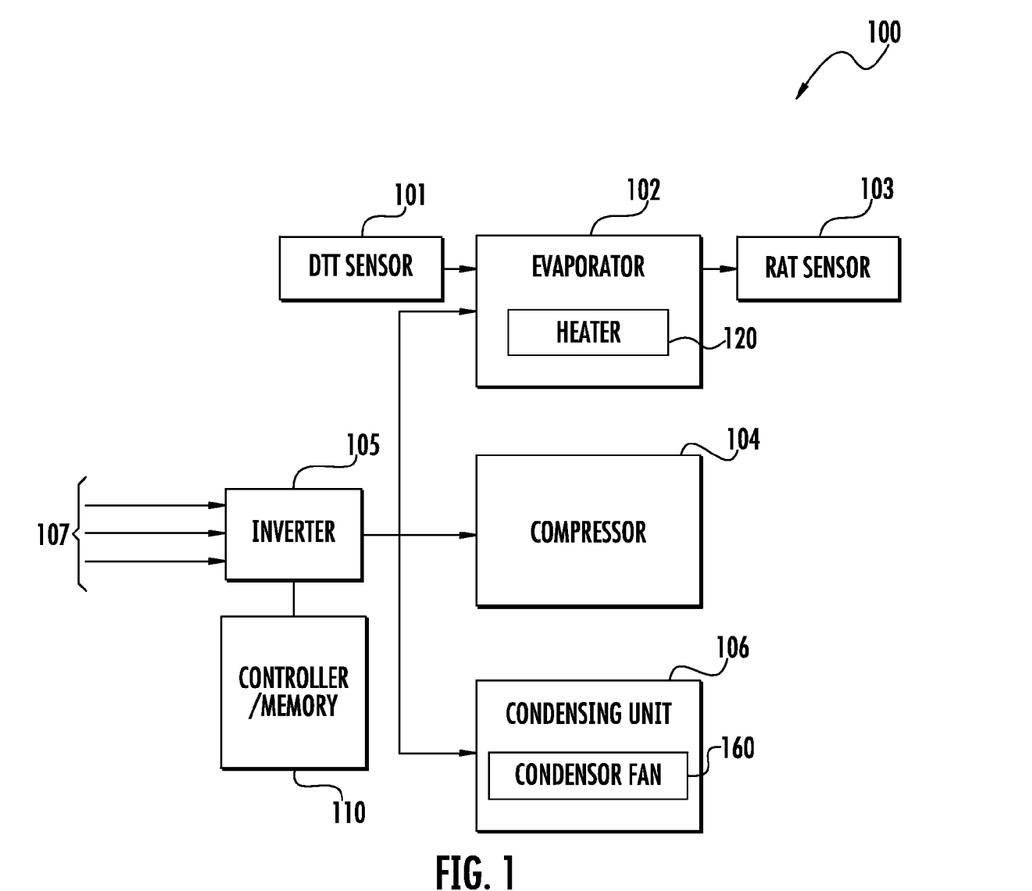
FIG. 1 illustrates a refrigeration system, according to an example embodiment.

Turning to FIG. 1, a simplified representation of a refrigeration system 100 for transport containers is illustrated. Additional components included within the system 100 are omitted from FIG. 1 for the purpose of clarity only, and are described in detail with reference to FIG. 2. The system 100 may be electrically powered. For example, the system 100 may be in electrical communication with a power medium 107. The power medium 107 may be supplied through a vehicle powered generator, AC mains, three-phase power grid, or any other suitable power supply.

The system 100 includes inverter 105 in communication with the power medium 107. The inverter 105 may convert power supplied through power medium 107 into power usable by the system 100.

The system 100 further includes evaporator 102 in communication with the inverter 105, and heater 120 in communication with the inverter 105 and the evaporator 102. The heater 120 may be arranged or mechanically mounted within/upon the evaporator 102 for relatively efficient defrosting and heating operations. Heater 120 may be a resistive heater, or other known form of heater.

The system 100 further includes sensor 101 in communication with the evaporator 102. The sensor 101 may be a temperature sensor coupled to the evaporator 102, also referred to as a defrost temperature thermistor (DTT). The sensor 101 may signal the start and/or cessation of defrosting operations.

The system 100 further includes sensor 103 in communication with the evaporator 102. The sensor 103 may be a Return Air Temperature (RAT) sensor, which may determine a temperature of a transport container being refrigerated. According to some example embodiments, the sensor 103 may also be a Supplied Air Temperature sensor. Further, a plurality of sensors may be used as sensor 103, including any combination of applicable or desirable sensors configured to determine temperature of a container or unit to be refrigerated.

The system 100 further includes compressor 104 in communication with the inverter 105. If compressor 104 is a variable speed compressor, the inverter 105 and controller 110 control the speed of the compressor 104. Alternatively, the compressor 104 may be a fixed speed compressor in exemplary embodiments. The system 100 further includes condensing unit 106 and condenser fan 160 in communication with the inverter 105.

Additionally, the system 100 includes a controller 110 in communication with one or more components of the system 100 to facilitate operation and control of the system 100. For example, the controller 110 may include any appropriate processing means including a general-purpose computer processor, microcontroller, ASIC, FPGA, discrete electrical control loops, or any combination thereof; and further comprise any appropriate memory or storage means to enable storage of computer executable instructions that, when executed by the controller 110, direct the controller 100 to perform any or all of the methods described herein.

Figure 2:
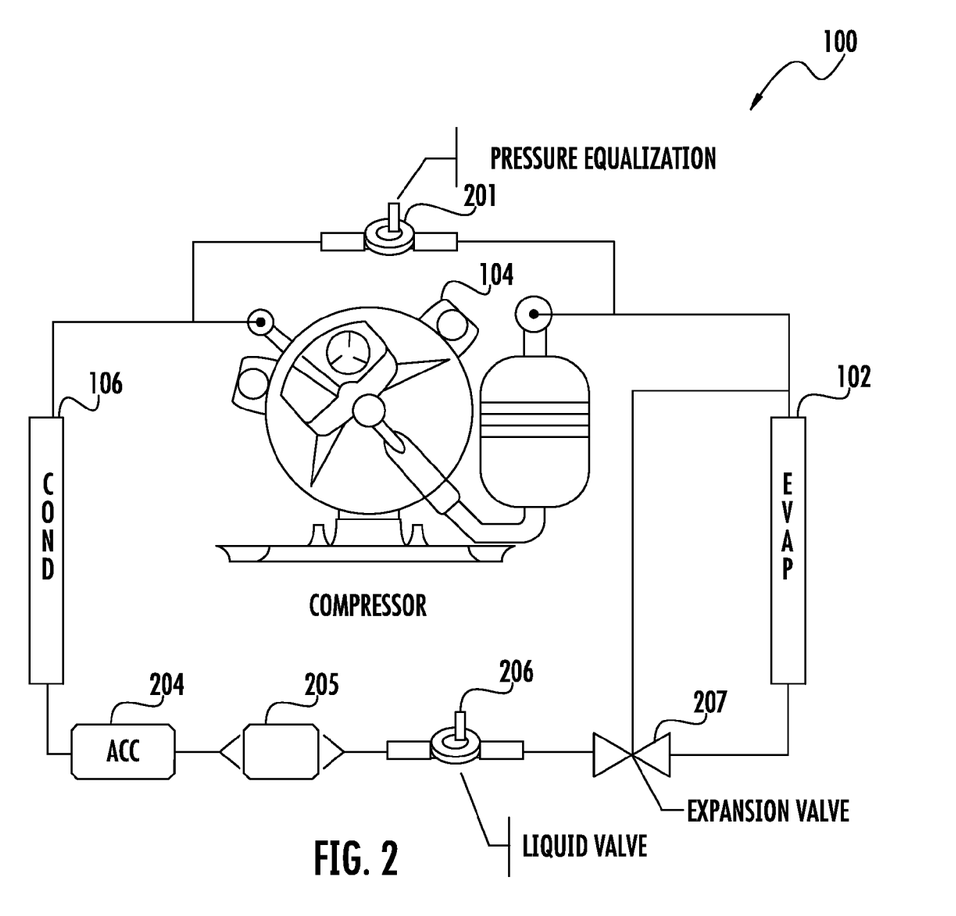
FIG. 2 illustrates a refrigeration system, according to an example embodiment.

Turning now to FIG. 2, a more detailed illustration of the refrigeration circuit of the system 100 is illustrated. As illustrated, the system 100 further includes pressure equalization valve (PEV) 201. The PEV 201 is arranged in series between the condenser 106 and the evaporator 102. Further, the PEV 201 is arranged in parallel across the compressor 104. The PEV 201 may equalize pressure established through the compressor 104 to avoid slugging as described herein.

The system further includes expansion valve 207 upstream of the evaporator 102. The expansion valve 207 is configured to allow expansion of refrigerant utilized in the system 100. The system 100 further includes liquid valve (LV) 206 arranged in series with and between the condenser 106 and the expansion vale 207. The system 100 further includes air cooled after cooler (ACC) 204, or a liquid accumulator, in series between the condenser 106 and the liquid valve 206. As described in further detail herein, the controller 110 controls the PEV 201 and liquid valve 206 during compressor restart to avoid liquid slugging.

Figure 3:
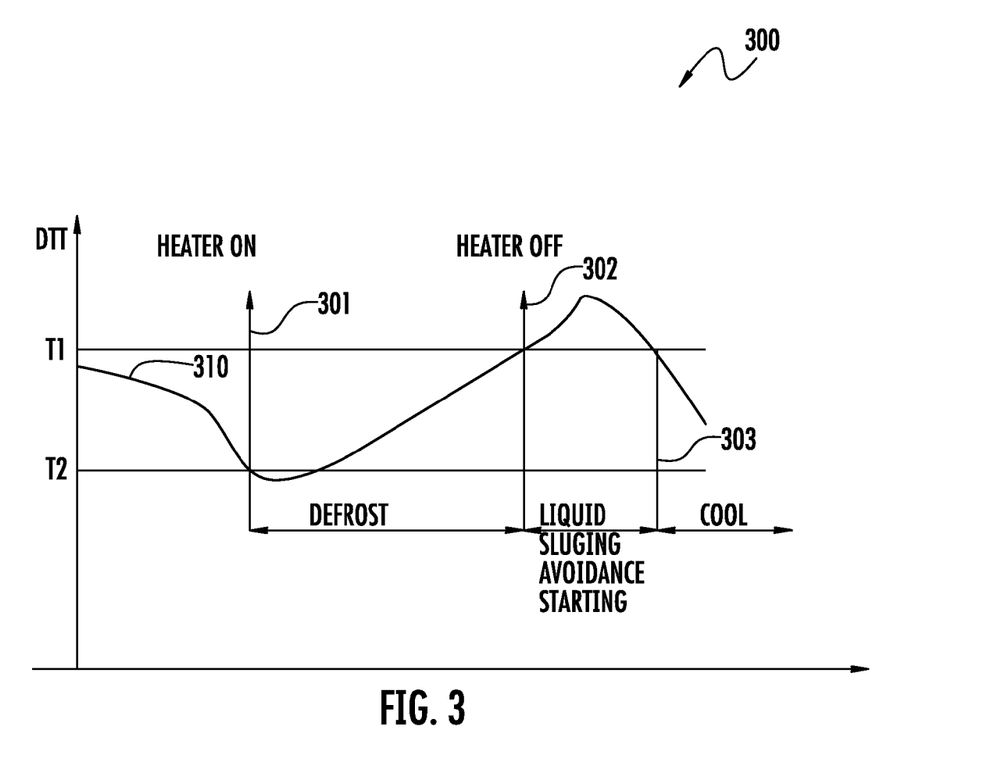
FIG. 3 is a representation of a defrost cycle and a liquid slugging avoidance process, according to an example embodiment.

Turning to FIG. 3, a representation of defrost conditions of the system 100 are illustrated, according to an example embodiment. As shown, temperature curve 310 represents the actual temperature value measured in the refrigeration system 100 or within the transport container. Temperature curve 310 may correspond to the temperature measured by the discharge temperature sensor 101 or sensor 103.

An appropriate or predetermined temperature range denoted as the range between temperature limit values T1 and T2 is also illustrated. This temperature range between T1 and T2 may be the appropriate temperature range for items contained in a refrigerated unit or container, limits of temperature of the unit or container, limits determined through an international or local standard, or any combination thereof. As further illustrated, as the detected temperature is relatively close to or below the lower temperature limit T2, denoted at time value 301, defrost operations are enabled.

The defrost cycle involves using a heater 120 (e.g., a resistor heater) to thaw ice from the evaporator coil. During the defrost cycle, defrost energy consumption of the system 100 is measured. The calculation of defrost energy consumption generally may be represented by power consumed (e.g., watts) by the heater 120 times the time to complete the defrost cycle (e.g., seconds).

Figure 4:
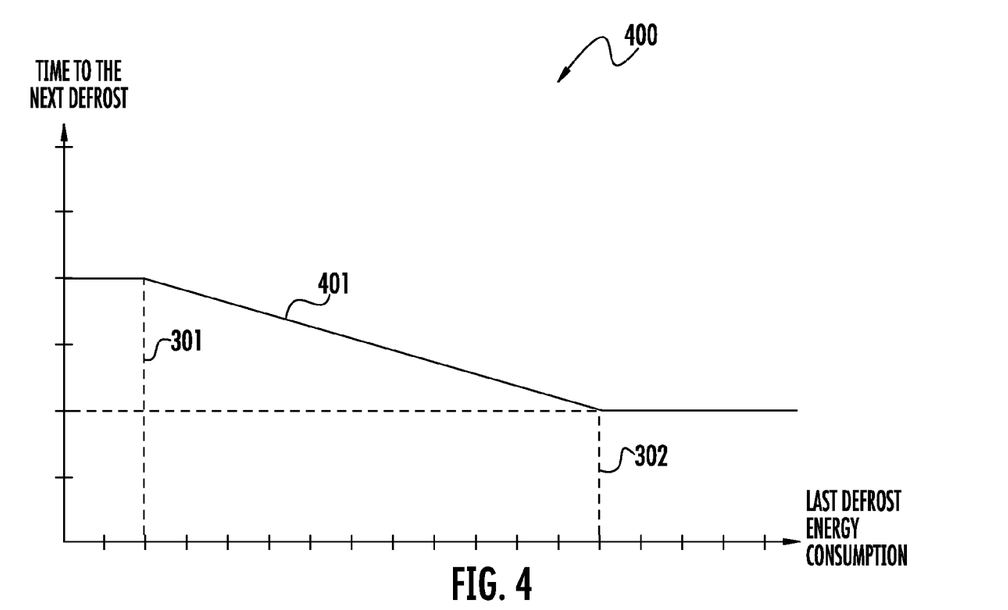
FIG. 4 is a representation of a relationship between defrost energy consumption versus time to the next defrost cycle, according to an example embodiment.

Upon calculation of the defrost energy consumption, a next appropriate time delay between defrost cycles may be determined by controller 110. FIG. 4 illustrates a relationship between defrost energy consumption in Watts×hour (Wh) or Watts×seconds (Ws) versus time delay to the next defrost cycle in minutes (min) or second (s). As shown in FIG. 4, the defrost energy consumption and time delay have a generally inverse relationship such that a high defrost energy consumption results in a shorter time delay to the next defrost cycle. FIG. 4 illustrates a linear relationship for a portion of the values. It is understood that other mathematical relationships may be used to determine the time delay as a function of the defrost energy consumption.

Referring back to FIG. 3, upon appropriate completion of defrosting, denoted by the temperature rising substantially close to temperature limit T1, refrigeration of the container may start.

Figure 5:
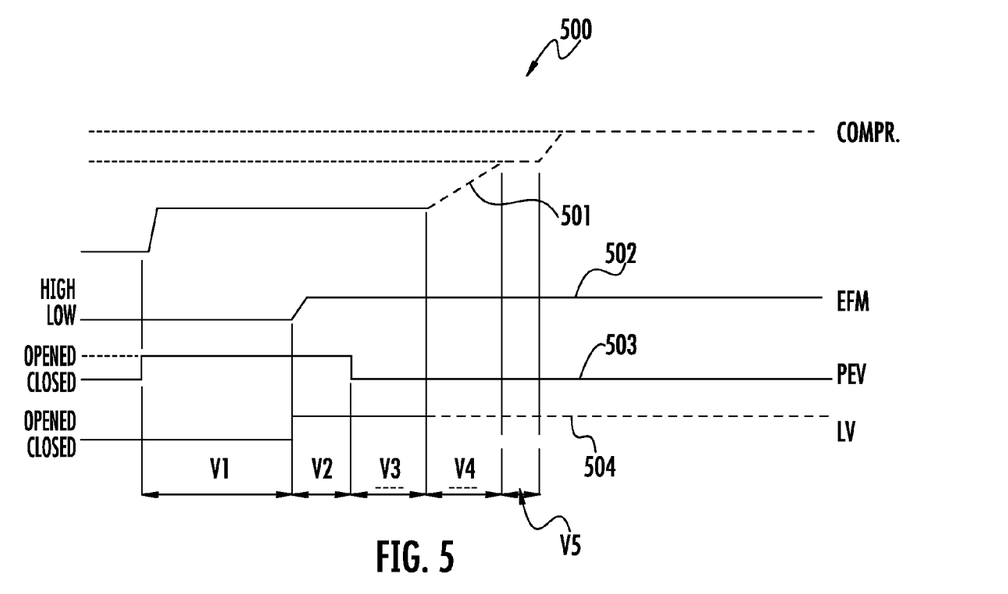
FIG. 5 illustrates a method of preventing liquid slugging in a refrigeration system, according to an example embodiment.

The start-up sequence of refrigeration system 100 may be facilitated by the controller 110 through the methods described below. FIG. 5 illustrates exemplary waveforms 500 in a method of preventing liquid slugging in refrigeration system 100 upon restart after defrost.

As illustrated, upon refrigeration restart the compressor 104 is activated at a low frequency or low power as shown at plot 501. If the compressor 104 is fixed speed, the compressor will stay at the same speed throughout the process. Furthermore, upon refrigeration commencement, the PEV 201 is fully opened as shown in plot 503. In response to the compressor operating at low frequency and the PEV 201 being opened for a predetermined or desired time V1, the liquid valve 206 is also opened as shown in plot 504 and the evaporator fan motor is driven to a higher speed as shown in plot 502.

Upon expiration of a second predetermined time threshold V2, the PEV 201 is closed. Upon expiration of a third predetermined time threshold V3, compressor 104 speed is ramped up to about 75% or less of available speed (depending upon cooling demand) over the course of a fourth predetermined time threshold V4. Speed is maintained for a fifth predetermined time threshold V5 at which point compressor 104 speed is driven to a maximum available or steady state operational speed. Alternatively, if the compressor is a fixed speed compressor, the compressor will stay at the same speed throughout the restart.

The predetermined time thresholds V1-V5 are established based upon desired reduction in liquid slugging of the refrigeration circuit of the system 100. For example, as the compressor superheat becomes positive and the compressor mass flow remaining low, threshold V1 expires and liquid valve 206 is opened. In response to pressure equalization, the compressor 104 speed is ramped as noted by the ramp in plot 501.

Upon reaching a desired percentage (e.g., 75%) or less (depending upon cooling demand) of available compressor speed, a short time delay V5 is introduced to stabilize the refrigeration cycle before bringing compressor 104 to steady state operating speed. Again, if the compressor is a fixed speed unit, the compressor will stay at the same speed throughout the restart with valves 201 and 206 being controlled as described above.

Figure 6:
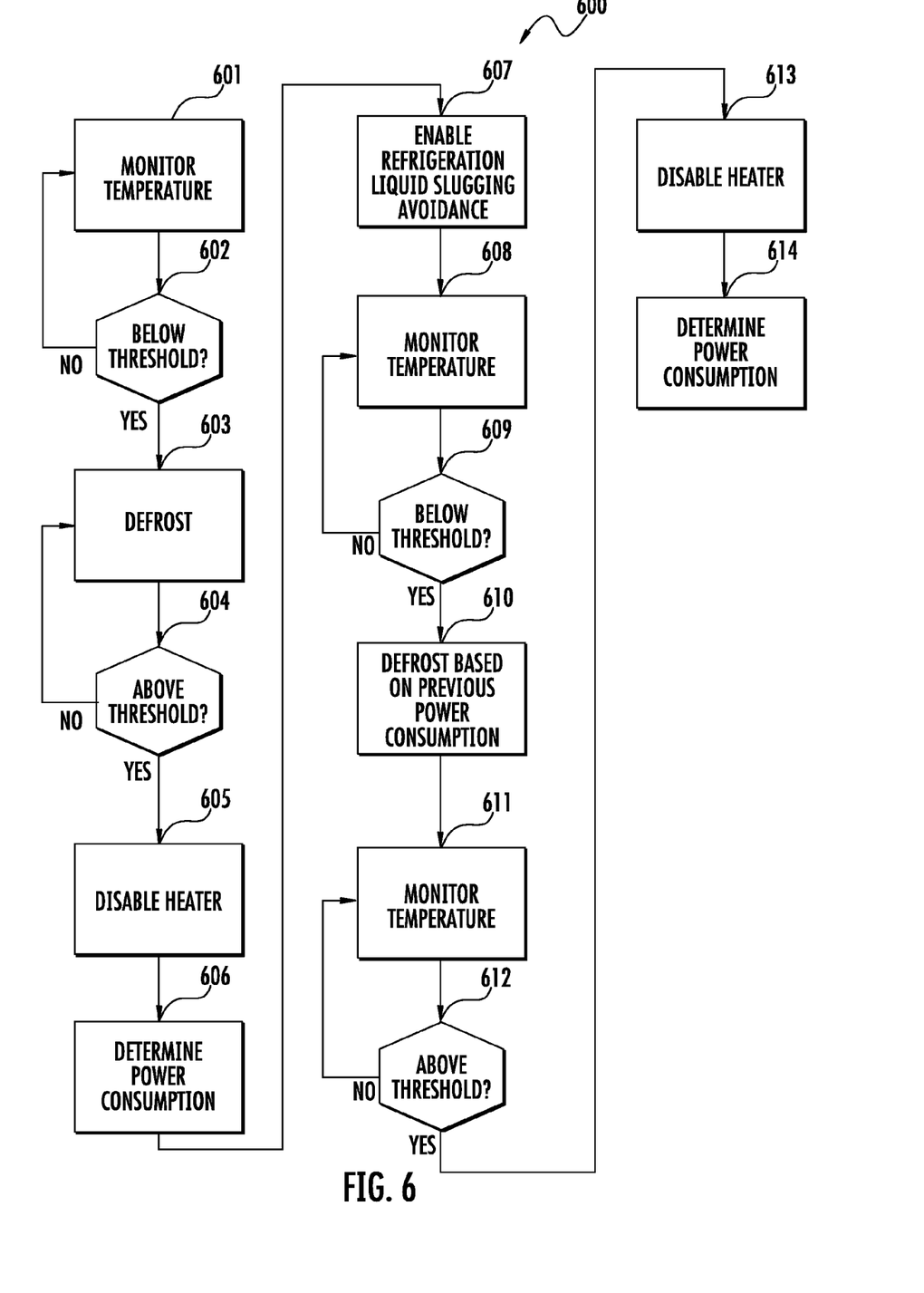
FIG. 6 illustrates a method of refrigeration control, according to an example embodiment.

Turning now to FIG. 6, a method of refrigeration control is illustrated. The method 600 includes monitoring a temperature of a unit or container being refrigerated at block 601. The method 600 further includes determining if the temperature (at sensor 103 or sensor 101) is below a defrost threshold at block 602. If the temperature is above the threshold, temperature monitoring continues at block 601. If the temperature is below the threshold the method includes beginning a defrost cycle at block 603. During the defrosting operation 603, the method 600 includes determining if the temperature of the unit is above a predetermined value at block 604. If the temperature has exceeded the threshold, heating/defrosting is disabled at block 605, and the method 600 includes determining defrost energy consumption during the previous defrost cycle at block 606 as described above with reference to FIG. 4.

The method 600 further includes enabling refrigeration using the liquid slugging avoidance method of FIG. 5, at block 607 in response to the determination. Thereafter, temperature is monitored at blocks 608-609, if the temperature of the unit is below the defrost threshold, the method includes defrosting the unit or container based upon the previous defrost cycle defrost energy consumption at block 610. During the defrost operation, temperature is monitored at blocks 611-612, and if the temperature of the unit or container is above the temperature threshold, heating is disabled at block 613, defrost energy consumption for the preceding defrost cycle is determined at block 614, and refrigeration using liquid slugging avoidance is initiated again at block 607.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of refrigeration control through a refrigeration system of a refrigerated transport container, comprising:
    performing a defrost cycle on the refrigeration system by activating a heat source; and
    restarting the refrigeration system after the defrost cycle has completed, wherein restarting the refrigeration system includes performing a liquid slugging avoidance process including:
    initiating a compressor of the refrigeration system at a speed;
    opening a pressure equalization valve in parallel with the compressor in response to the initiating;
    opening a liquid valve in series between a condenser and an evaporator after a predetermined amount of time has elapsed from opening of the pressure equalization valve, the liquid valve and the pressure equalization valve both being open at the same time; and
    closing the pressure equalization valve after a period of time.

2. The method of claim 1, further comprising increasing the speed of the compressor after closing of the pressure equalization valve.

3. The method of claim 2, wherein increasing the speed of the compressor occurs after a predetermined amount of time has elapsed from the closing of the pressure equalization valve.

4. The method of claim 1, further comprising initiating an evaporator fan motor after opening the pressure equalization valve.

5. The method of claim 4, wherein initiating the evaporator fan motor occurs after a predetermined amount of time has elapsed from opening the pressure equalization valve.

6. The method of claim 1, wherein closing the pressure equalization valve occurs after a predetermined amount of time has elapsed from opening the liquid valve.

7. The method of claim 1, wherein closing the pressure equalization valve occurs after a predetermined amount of time has elapsed from initiating the compressor.

8. The method of claim 1, wherein performing the defrost cycle includes:
    determining a defrost energy consumption by the heat source during the defrost cycle;
    determining a time delay until a next defrost cycle in response to the defrost energy consumption during the defrost cycle.

9. A refrigeration system, comprising:
    a condenser;
    a compressor in serial communication with the condenser;
    an evaporator in serial communication with the condenser and the compressor;
    a heat source for thawing an evaporator coil during a defrost cycle;
    a pressure equalization valve arranged in parallel with the compressor;
    a liquid valve in series between the condenser and the evaporator;
    a controller for controlling the pressure equalization valve and the liquid valve to implement a liquid slugging avoidance process upon restart of the compressor after a defrost cycle;
    wherein:
    the liquid slugging avoidance process includes;
    initiating the compressor at a speed;
    opening the pressure equalization valve in response to the initiating;
    opening the liquid valve after a predetermined amount of time has elapsed from opening the pressure equalization valve, the liquid valve and the pressure equalization valve both being open at the same time; and
    closing the pressure equalization valve after a period of time.

10. The refrigeration system of claim 9, wherein the liquid slugging avoidance process includes increasing the speed of the compressor after closing of the pressure equalization valve.

11. The refrigeration system of claim 10, wherein increasing the speed of the compressor initiates after a predetermined amount of time has elapsed from the closing of the pressure equalization valve.

12. The refrigeration system of claim 9, wherein the liquid slugging avoidance process includes initiating an evaporator fan motor after opening the pressure equalization valve.

13. The refrigeration system of claim 9, wherein closing the pressure equalization valve occurs after a predetermined amount of time has elapsed from opening the liquid valve.

14. The refrigeration system of claim 9, wherein closing the pressure equalization valve occurs after a predetermined amount of time has elapsed from initiating the compressor.

15. The refrigeration system of claim 9, wherein the defrost cycle includes:
    determining a defrost energy consumption by the heat source during the defrost cycle;
    determining a time delay until a next defrost cycle in response to the defrost energy consumption during the defrost cycle.

16. A refrigeration system, comprising:
    a condenser;
    a compressor in serial communication with the condenser;
    an evaporator in serial communication with the condenser and the compressor;
    a heat source for thawing an evaporator coil during a defrost cycle;
    a pressure equalization valve arranged in parallel with the compressor;
    a liquid valve in series between the condenser and the evaporator; and a controller for controlling the pressure equalization valve and the liquid valve to implement a liquid slugging avoidance process upon restart of the compressor after a defrost cycle;
wherein:
the liquid slugging avoidance process includes;
initiating the compressor at a speed;
opening the pressure equalization valve in response to the initiating;
opening the liquid valve after a first predetermined amount of time has elapsed from opening the pressure equalization valve, the liquid valve and the pressure equalization valve both being open at the same time;
increasing an evaporator fan motor after the first predetermined amount of time has elapsed from opening the pressure equalization valve;
closing the pressure equalization valve after a second predetermined amount of time has elapsed from opening the liquid valve; and
increasing the compressor speed after a third predetermined amount of time has elapsed from closing the pressure equalization valve.

\* \* \* \* \*